Patented Feb. 3, 1925.

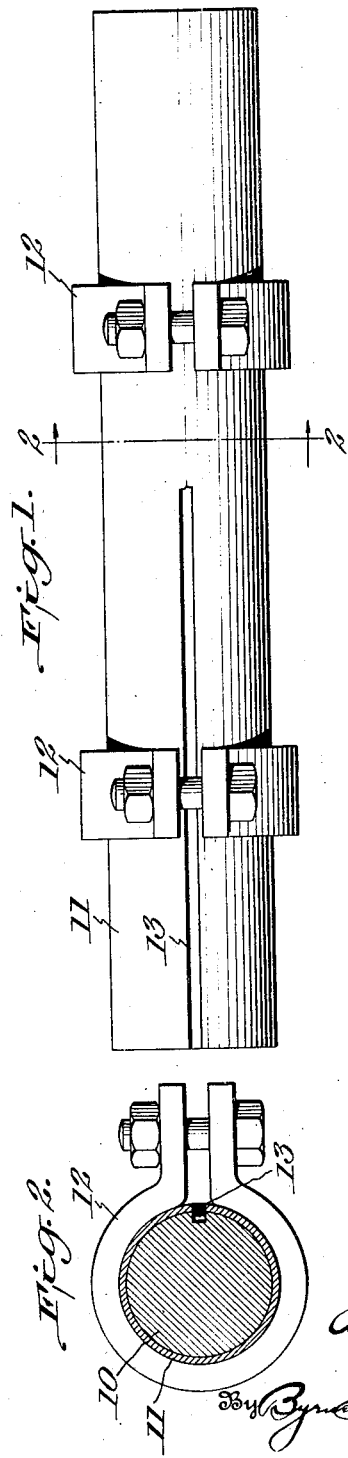

1,524,795

UNITED STATES PATENT OFFICE.

ADOLF LÖHR, OF HOCHST-ON-THE-MAIN, GERMANY, ASSIGNOR TO FARBWERKE VORM. MEISTER LUCIUS & BRÜNING, OF HOCHST-ON-THE-MAIN, GERMANY, A CORPORATION OF GERMANY.

PROCESS FOR APPLYING COATINGS TO CORES.

Application filed November 9, 1923. Serial No. 673,820.

*To all whom it may concern:*

Be it known that I, ADOLF LÖHR, a citizen of Germany, residing at Hochst-on-the-Main, Germany, have invented certain new and useful Improvements in a Process for Applying Coatings to Cores, of which the following is a specification.

The present invention relates to a process of applying thin coatings to cores and more particularly to the application of thin coatings of noble metal upon cores of base metal.

For a full understanding of the invention and its characteristic features, reference is made to the accompanying drawings in which—

Fig. 1 is an elevational view illustrating the invention; and

Fig. 2 is a cross-section on line 2—2, Fig. 1.

In the drawings 10 represents a solid cylindrical core such as may be employed for instance as pressure rollers in the textile industry. However, it is understood that the invention is applicable to hollow cores as well as to solid cores.

The thin tubular body 11 represents a coating of rust-proof or corrosion-resisting metal, or of relatively noble metal in general.

In accordance with the principle of operation of the invention the tubular body 11 is prepared, preferably by rolling, to have when placed over the core a good contact fit all about it, leaving, however, a gap of about 3 mm. between the abutting ends.

A plurality of special clamps 12 are then placed about the tubular body 11 for tightly pressing the latter into contact with the core. The clamps are, of course, preferably so spaced as to obtain a substantially uniform fit over the whole length of the body 11 and core 10, and then drawn up.

The welding operation is then carried out from one end to the other. To insure the best results, it is advisable, if not essential, to move the clamps so that at or closely adjacent to the place where the welding action takes place, a clamp holds the tubular member in tightly compressed condition. It is merely necessary to intermittently open one of the clamps, move it and draw it up again.

After the welding action is completed, the resulting fin is then removed by grinding or if necessary by preliminary turning on a lathe and subsequent polishing. The result is a highly polished, uniformly and tightly fitting coating of accurate external diameter which is the equivalent of an accurately machined cylinder.

I find it advantageous to provide the core with a lengthwise groove 13 of approximately 5 mm. width and 5 mm. depth. The tubular body 11 is so positioned that the gap between its abutting ends is in register with the groove 13 whereby a good tight welding seam of full sheet metal strength may be produced intimately and uniformly binding the free ends together.

I claim:

1. A process of applying a coating to a core, which consists in forming a split tubular body to closely fit about the core, pressing the tubular body tightly upon the surface of the core and forming a continuous metal bond between the adjoining edges of the tubular body while maintaining the pressing action.

2. A process of applying a coating to a core, which consists in forming a split tubular body to closely fit about the core but so as to leave a small gap between the adjoining edges, pressing the tubular body tightly upon the surface of the core and forming a continuous metal bond between the adjoining edges of the tubular body while maintaining the pressing action.

3. A process of applying a coating to a core, which consists in forming a split tubular body to closely fit about the core but so as to leave a small gap between the adjoining edges, applying pressure upon the tubular body circumferentially thereof in a plane substantially at right angle to the core, effecting a metal bond between the adjoining edges of the tubular body at points adjacent to said plane, and progressively shifting the planes of application of pressure while progressively bonding the adjoining edges of the tubular body throughout the whole length thereof.

4. A process of applying a coating to a core, which consists in forming a longitudinal groove in the peripheral surface of the core, forming a split tubular body to closely fit about the core but so as to leave a small gap in registry with the groove in the core, pressing the tubular body tightly upon the core and forming a continuous metal bond between the adjoining edges of the tubular body while maintaining the pressing action.

5. A process of applying a coating to a core, which consists in forming a longitudinal groove in the peripheral surface of the core, forming a split tubular body to closely fit about the core but so as to leave a small gap in registry with the groove in the core, applying pressure upon the tubular body circumferentially thereof in a plane substantially at right angle to the core, effecting a metal bond between the adjoining edges of the tubular body at points adjacent to said plane, and progressively shifting the planes of application of pressure while progressively bonding the adjoining edges of the tubular body throughout the whole length thereof.

6. Process according to claim 1 including the step of removing an excess of material on the outer surface of the tubular body resulting from the bond, to effect uniformity of the surface.

In testimony whereof, I affix my signature.

ADOLF LÖHR.

Witnesses:
PAUL A. WILLIAMS,
C. SCHICHERT.